United States Patent [19]

Nobukawa et al.

[11] 4,410,192
[45] Oct. 18, 1983

[54] WEDGE-OPERATED JAW CHUCK FOR HOLDING WORK ON A MACHINE TOOL

[75] Inventors: Akira Nobukawa, Fukuayama; Tatsuei Sawaguchi, Fuchu, both of Japan

[73] Assignee: Kabushiki Kaisha Kitagawa Tekkosho, Hiroshima, Japan

[21] Appl. No.: 224,867

[22] Filed: Jan. 14, 1981

[30] Foreign Application Priority Data

Jan. 18, 1980 [JP] Japan ................................ 55-5137

[51] Int. Cl.³ .............................................. B23B 31/16
[52] U.S. Cl. ..................................... 279/121; 279/123
[58] Field of Search ............... 279/121, 110, 123, 19.5

[56] References Cited

U.S. PATENT DOCUMENTS

| | | | |
|---|---|---|---|
| 1,886,083 | 0/1932 | Church | 279/121 |
| 2,704,214 | 0/1955 | Beausoleil | 279/121 |
| 3,198,533 | 0/1965 | Goodrum | 279/121 |
| 3,494,627 | 11/1967 | Pirman | 279/121 |
| 3,682,491 | 8/1972 | Sakazaki | 279/121 |
| 3,765,691 | 0/1973 | Saruhashi | 279/121 |
| 3,926,446 | 0/1975 | Rohm | 279/121 |
| 4,288,085 | 9/1981 | Antoni | 279/121 |

FOREIGN PATENT DOCUMENTS 106707  1/1980  Japan ................................ 279/121

*Primary Examiner*—Z. R. Bilinsky
*Assistant Examiner*—Daniel W. Howell
*Attorney, Agent, or Firm*—Beveridge, DeGrandi & Kline

[57] ABSTRACT

Three gripping jaws are slidably engaged in respective radial guide grooves in the front face of an annular jaw carrier for holding work to be machined. Each gripping jaw has a wedge integrally projecting rearwardly therefrom. The wedge is of T-shaped cross section, including a web extending radially of the jaw carrier and a flange at the inner end of the web. Slidably mounted in the jaw carrier for axial movement therein, a plunger has undercut wedge grooves for slidably receiving the flanges and parts of the webs of the respective wedges, causing the radial motion of the gripping jaws by a wedging action upon axial motion of the plunger. A pair of opposed overhanging portions formed by each undercut wedge groove in the plunger are caught between the jaw carrier and the flange of one of the wedges. Thus, in spite of the unavoidable centrifugal displacement of the gripping jaws during the high-speed rotation of the chuck, the overhanging portions of the plunger are subject to no significant bending stresses, being held against the jaw carrier, and so are protected from rupture or strain.

8 Claims, 9 Drawing Figures

WEDGE-OPERATED JAW CHUCK FOR HOLDING WORK ON A MACHINE TOOL

BACKGROUND OF THE INVENTION

This invention relates to a chuck for holding work on a machine tool such as a lathe, and more specifically to such a work-holding chuck of the type having gripping jaws that are operated by a wedging action.

A wedge-operated jaw chuck of the class under consideration comprises a plurality of, normally three, gripping jaws mounted on an annular jaw carrier for sliding motion in its radial direction, and a plunger mounted in the jaw carrier for sliding motion in its axial direction to cause the radial motion of the gripping jaws by a wedging action. As heretofore constructed, each gripping jaw has its inner end portion formed into a wedge of T-shaped cross section, for sliding engagement in one of undercut wedge grooves in the plunger.

When the chuck of this familiar design is mounted on the main spindle of a lathe, for example, for holding work to be machined, the gripping jaws inevitably undergo centrifugal displacement in the radially outward direction with an increase in the speed of rotation of the spindle. The gripping force of the jaws lessens gradually, until at last the work becomes unmachinable. This drawback of the prior art will be illustrated and later explained in more detail.

One conventional attempt to overcome the above problem dictates the use of counterweights to compensate for, or take advantage of, the centrifugal forces of the gripping jaws, as disclosed in Japanese Patent Publication No. 48-15994. Although finding some acceptance in the machining industry, this known approach is nevertheless unsatisfactory in view of the complexity of configuration resulting from the use of the counterweights.

SUMMARY OF THE INVENTION

The present invention seeks to eliminate the noted problem of the prior art, making it possible for the gripping jaws of a wedge-operated chuck to hold work positively in spite of centrifugal forces exerted thereon, without use of means that would render the construction of the chuck complex. The invention also seeks to reduce the weight of the gripping jaws, and to improve the rigidity and strength of the various parts, as far as possible.

The improved chuck according to this invention comprises a plurality of gripping jaws slidably engaged in respective guide grooves in an annular jaw carrier for movement in its radial direction to engage and disengage work to be machined. Each gripping jaw integrally includes a wedge projecting toward the jaw carrier therefrom, with the wedge being composed of a web extending radially of the jaw carrier and a flange at one end of the web. Also included in the chuck is a plunger slidably mounted in the jaw carrier for movement in its axial direction to cause the radial motion of the gripping jaws by a wedging action. The plunger has a plurality of undercut wedge grooves formed in its circumference at an angle to its axis.

According to this improved chuck construction the pair of opposed overhanging portions of the plunger, created by each undercut wedge groove therein, are caught between the jaw carrier and the flange of one of the wedges. Thus, although the gripping jaws tend to undergo centrifugal displacement in the radially outward direction in the operation of the chuck, exerting forces on the overhanging portions of the plunger in the same direction via the flanges of their wedges, these overhanging portions are held against the inside surface of the annular jaw carrier and thereby prevented from rupture or strain due to bending stresses. The overhanging portions receive, in fact, only compressive stresses, instead of bending stresses that have been applied to such overhanging portions in the conventional chucks of comparable design. The improved chuck of this invention is therefore capable of positively gripping work practically irrespective of its speed of rotation.

The above and other objects, features and advantages of this invention and the manner of attaining them will become more apparent, and the invention itself will best be understood, from the following description and appended claims, taken in connection with the attached drawings showing a preferred embodiment of the invention and some of its possible modifications.

DETAILED DESCRIPTION OF THE INVENTION

Figure 1:
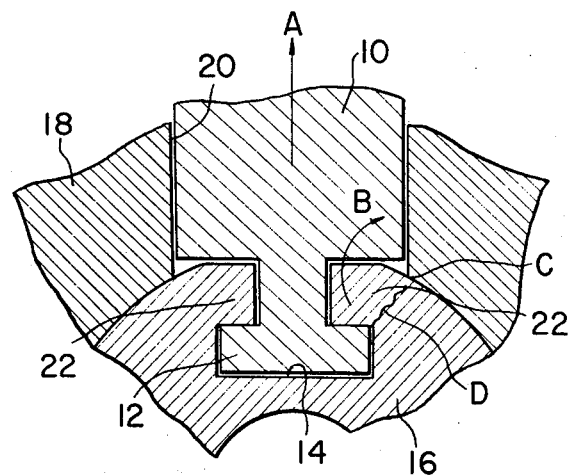
FIG. 1 is a fragmentary sectional view of the prior art chuck bearing particular pertinence to this invention, the view being explanatory in particular of the manner of engagement of the wedge on each gripping jaw with the plunger.

The noted problem attendant upon the typical conventional wedge-operated jaw chuck will now be discussed in some more detail in conjunction with its fragmentary sectional representation given in FIG. 1, the better to distinguish the present invention therefrom. Each gripping jaw 10 of the illustrated prior art chuck has one of its ends formed into a wedge 12 of T-shaped cross section, which is slidably engaged in an undercut wedge groove 14 in a plunger 16. This plunger is slidably mounted in an annular jaw carrier 18 carrying the jaws 10 so as to permit their sliding motion along radial guide grooves 20.

It will be seen that the plunger 16 has a pair of opposed overhanging portions 22 formed by each undercut wedge groove 14. When holding work, the gripping jaws 10 receive forces in a direction radially outwardly of the jaw carrier 18, as indicated by the arrow A. Thus the wedge 12 of each jaw exerts bending stresses B on the overhanging portions 22 of the plunger 16, tending to bend them about their points C of contact with the edges of the jaw carrier 18. The outward forces A and bending stresses B increase in proportion with the speed of rotation of the chuck. Ultimately, therefore, the overhanging portions 22 of the plunger may become ruptured as at D.

The present invention avoids the application of bending stresses to such overhanging portions of the plunger in order to protect them from rupture or strain. The following, then, is the description of a preferred embodiment of the invention illustrated in FIGS. 2 through 6.

Figure 2:
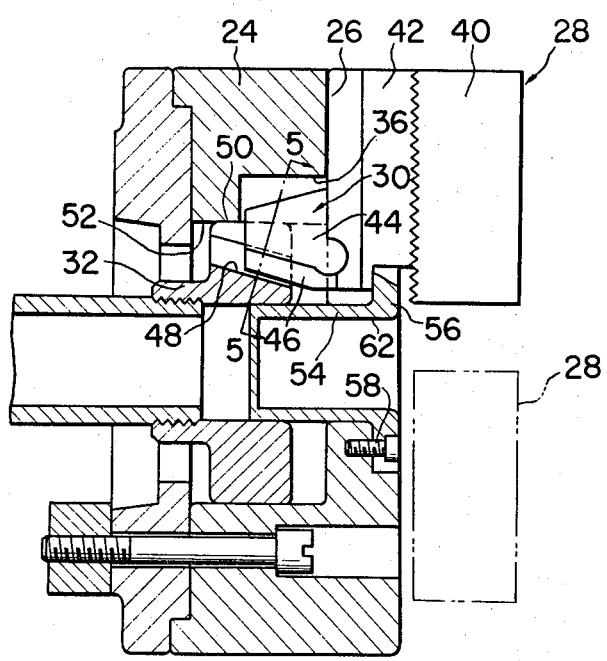
FIG. 2 is an axial sectional view of the chuck constructed in accordance with the invention.

With particular reference to FIG. 2 the wedge-operated jaw chuck according to this invention broadly comprises:

1. an annular jaw carrier 24 having a plurality of, typically three, undercut guide grooves 26 formed radially therein;

2. gripping jaws 28 slidably engaged in the respective guide grooves 26 in the jaw carrier 24 and having wedges 30 formed integral therewith; and 3. a plunger 32 slidably mounted in the jaw carrier 24 for movement in its axial direction to cause the radial motion of the gripping jaws by a wedging action.

In the subsequent description of this embodiment, and in the claims appended hereto, the directional terms "front" and "rear", as well as "forward" and "rearward", will refer to the directions toward the right and toward the left, respectively, of the chuck as seen in FIG. 2. Thus, for example, the jaw carrier 24 has the undercut guide grooves 26 formed in its front face, and the wedges 30 project rearwardly from the gripping jaws 28. Further the terms "inner" and "outer", as well as "inward" and "outward", will be used with the axis of the chuck taken as the inmost position. The wedges 30 are therefore located on the inner ends of the gripping jaws.

Figure 3:
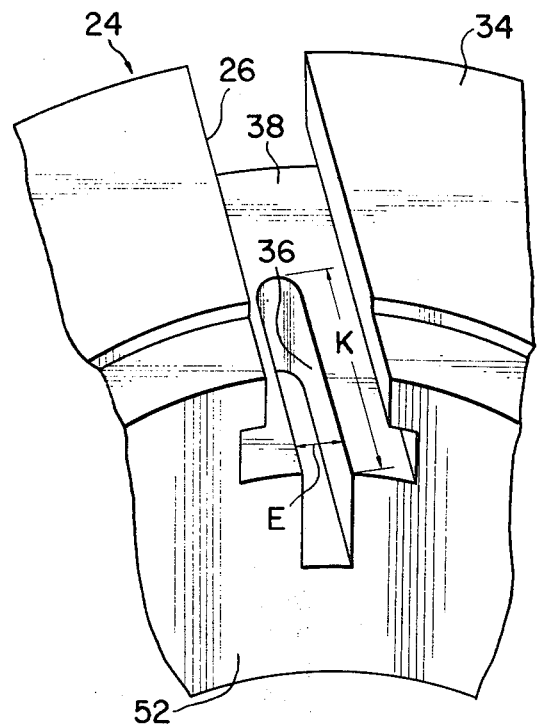
FIG. 3 is an enlarged, fragmentary perspective view of the jaw carrier in the chuck of FIG. 2.

As will be seen also from FIG. 3, the jaw carrier 24 has the three undercut guide grooves 26 formed radially in its front face 34 at constant angular spacings. Additionally, the jaw carrier has a slot 36 formed in the bottom 38 of each guide groove 26 so as to extend radially outwardly from its inner end and to terminate short of its outer end.

Each gripping jaw 28 is shown to be of the split type, comprising a jaw proper 40 and a base 42 which are bolted or otherwise fastened together. The gripping jaws could of course be of unitary design, however.

Figure 4:
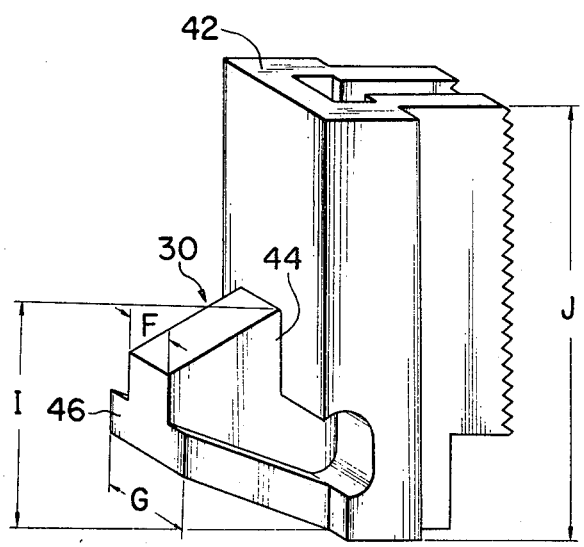
FIG. 4 is an enlarged perspective view of one of the jaw bases, complete with the wedge, in the chuck of FIG. 2.
Figure 5:
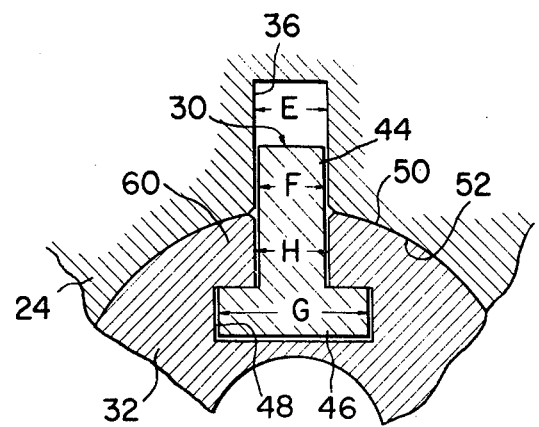
FIG. 5 is an enlarged sectional view taken along the line 5—5 of FIG. 2 and showing the arrangement of each wedge relative to the jaw carrier and the plunger.

As pictured in detail in FIG. 4, each gripping jaw 28, or its base 42, is of T-shaped cross section to be slidably fitted in one of the undercut guide grooves 26 in the jaw carrier 24. The wedge 30 projecting rearwardly from the inner end of each jaw base 42 is also of T-shaped cross section, comprising a web 44 extending radially of the jaw carrier 24 and a flange 46 at the inner end of the web. The flange 46 is formed at an angle to the axis of the chuck to act as a wedge. The outer part of the web 44 is to be movably or slidably received in each slot 36 in the jaw carrier 24.

It will be noted that the web 44 has its outer end inclined inwardly as it extends rearwardly from the jaw base 42. An inspection of FIG. 2 will reveal that the outer end of each slot 36 in the jaw carrier 24 terminates radially outwardly relative to the sloping outer end of the web received therein. As will be observed from FIG. 5, moreover, the width E of the slot 36 should be as close as feasible to the width F of the web 44.

Figure 6:
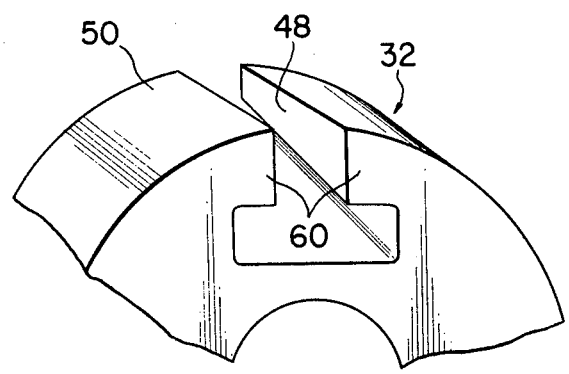
FIG. 6 is an enlarged, fragmentary perspective view of the plunger in the chuck of FIG. 2.

With reference to both FIGS. 2 and 6 the plunger 32 takes the form of a hollow, flanged cylinder. Undercut wedge grooves 48 are formed in the flange of the plunger 32 at constant circumferential spacings for slidably receiving the flanges 46, and parts of the webs 44, of the wedges 30. Each wedge groove 48 is angled with respect to the axis of the plunger or of the complete chuck. Thus, upon movement of this plunger in the axial direction of the jaw carrier 24, all the gripping jaws 28 move radially of the jaw carrier by a wedging action. The outer surface 50 of the plunger 32 is in sliding contact with the inner surface 52 of the jaw carrier 24, with as little clearance as possible.

FIG. 2 further shows at 54 a retainer in the form of a hollow cylinder having its rear end fitted in the plunger 32. A flange 56 on the front end of this retainer is screwed at 58 to the jaw carrier 24 and is in engagement with the inner ends of the jaw bases 42.

In the wedge-operated jaw chuck of the foregoing construction the gripping jaws 28 receive radially outward forces when holding work on a machine tool. As will be seen upon consideration of FIG. 5, it is the pair of opposed overhanging portions 60 of the plunger 32, formed by each undercut wedge groove 48 therein, that bear the outward forces of the gripping jaws 28 via the flanges 46 of their wedges 30 for retaining the gripping jaws in position on the jaw carrier. However, since the outer surface 50 of the plunger 32 makes sliding contact with the inner surface 52 of the jaw carrier 24, as has been stated, the overhanging portions 60 of the plunger receive practically no bending stresses but only compressive ones. This holds true even when the gripping jaws undergo some centrifugal displacement with the increase in the rotative speed of the chuck, so that the overhanging portions of the plunger are effectively protected against rupture or strain due to bending stresses.

In order to realize the above desired results, certain prescribed dimensional relations must exist among the slots 36 in the jaw carrier 24, the undercut wedge grooves 48 in the plunger 32, and the wedges 30 of the gripping jaws 28. Namely, with reference to FIG. 5:

1. The width G of the flange 46 of each wedge 30 is greater than the spacing H between each pair of opposed overhanging portions 60 of the plunger 32.

2. The spacing H is only slightly more than the width F of the web 44 of each wedge 30.

3. The width E of each slot 36 in the jaw carrier 24 is less than the width G of the flange 46.

4. The width E of the slot 36 is, for the best results, approximately equal to the spacing H between the pair of overhanging portions 60.

No less important than the rigidity and strength of the plunger 32 are those of the gripping jaws 28 and the jaw carrier 24. The maximum radial dimension I (FIG. 4) of the wedge 30 on each gripping jaw base 42 should not exceed approximately one half of the radial dimension J of the jaw base. Any larger wedge is objectionable in consideration of the greater weight of the jaw and hence of its greater centrifugal displacement in the operation of the chuck. The relatively small dimension I of the wedge 30 also makes it possible to keep the length K (FIG. 3) of each slot 36 at a minimum and hence to avoid any undue decrease in the strength of the jaw carrier 24. It is also possible in this manner to prevent the jaws from flying away in the very rare event of breakage of the plunger or wedges.

It should be appreciated that the T-shaped configuration of each wedge 30 is well calculated to retain, in coaction with the plunger 32, the gripping jaw 28 in place on the jaw carrier 24 in spite of the radially outward force exerted thereon in use. By appropriate selection of the widths F and G of its web 44 and flange 46, the outside diameter of the plunger 32 can be reduced to a minimum, and the diameter of a bore 62 in the retainer 54, intended for the insertion of bar stock to be machined, can be increased to a maximum. The sloping outer end of the web 44 of each wedge 30 serves to reduce its weight and to increase the strength of the jaw carrier 24.

Figure 7:
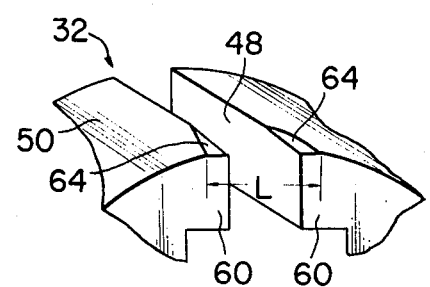
FIG. 7 is a view similar to FIG. 6 but showing a modification of the plunger.

FIG. 7 shows a slight modification of the foregoing embodiment, featuring chamfers 64 formed at a pair of front, outer corners of the plunger 32 created by each undercut wedge groove 48 therein. These chamfers function to increase the pliancy of the overhanging portions 60 of the plunger. Further, since the jaw carrier 24 of FIG. 3 is slotted at 36, the contact between the mating surfaces 50 and 52 of the plunger 32 and the jaw carrier 24 becomes more intimate as the compressive stresses on the overhanging portions 60 increase. Preferably, not necessarily, the distance L between the opposite extremities of each pair of chamfers 64 is less than the width G of the flange 46 of each wedge 30. The provision of the chamfers 64 is preferred because they contribute to the smoother sliding motion of the mating parts and to higher chucking efficiency for the above stated reason.

Figure 8:
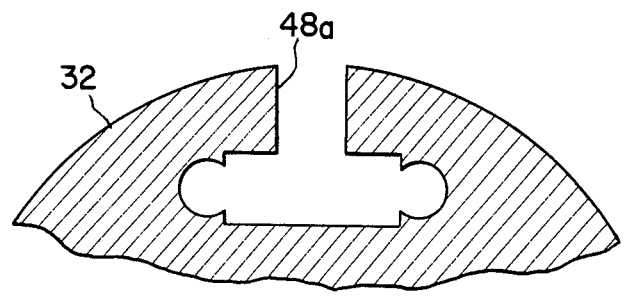
FIG. 8 is a fragmentary sectional view of another modified plunger.
Figure 9:
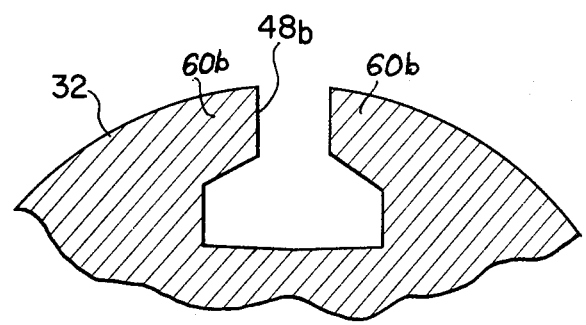
FIG. 9 is a similar view of still another modified plunger.

FIGS. 8 and 9 are cross sectional representations of different modified undercut wedge grooves 48a and 48b in the plunger 32.

In FIG. 9 the lower surface of each overhanging portion 60b is inclined in such a manner that the thickness of each overhanging portion gradually decreases toward the tip thereof. The flange 46 of the wedge 30 is shaped to fit the undercut wedge groove 48b. Such structure contributes to the increased strength of the overhanging portions 60b and the flange 46 of the wedge 30. It is of course understood that the wedges to be fitted in these wedge grooves 48a and 48b are correspondingly modified in shape. These modifications represent, however, only two examples of numerous such possible modifications intended to enhance rigidity and/or to avoid the concentration of stresses.

Additional modifications or variations in the parts, arrangements and configuration of the exemplified chuck disclosed herein will occur to one skilled in the art in a manner limited only by a just interpretation of the following claims.

What is claimed is:

1. A wedge-operated jaw chuck to be mounted on a machine tool for holding work to be operated upon comprising:
    (a) an annular jaw carrier having a plurality of guide grooves formed radially in its front face and a plurality of slots formed one in the bottom of each guide groove so as to extend radially outwardly from the inner end of said groove, said slot being narrower than said groove,
    (b) a plurality of gripping jaws slidably engaged one in each guide groove in the jaw carrier for movement in its radial direction to engage and disengage work;
    (c) a wedge integrally projecting rearwardly from each gripping jaw and comprising a web extending radially of the jaw carrier and a flange at the inner end of the web, the width of the web being less than the width of the flange, part of its web being movably received in one of the slots in the jaw carrier; and
    (d) a plunger slidably mounted in the jaw carrier for movement in its axial direction, the plunger having a plurality of undercut wedge grooves formed in its circumference at an angle to its axis for slidably receiving the wedges of the gripping jaws to cause the movement of the gripping jaws in the radial direction of the jaw carrier by a wedging action upon movement of the plunger in its axial direction, the plunger having a pair of opposed overhanging portions which are formed by each undercut wedge groove and which lie between the jaw carrier and the flange of one of the wedges;
    (e) whereby, upon radial outward displacement of the gripping jaws in the operation of the chuck, the overhanging portions of the plunger are held against the jaw carrier and thus are protected against rupture or strain due to bending stresses.

2. The chuck of claim 1, wherein each slot in the jaw carrier has a width approximately equal to the spacing between each pair of opposed overhanging portions of the plunger.

3. The chuck of claim 1 or 2, wherein the web of each wedge has its outer end inclined inwardly as it extends rearwardly from one of the gripping jaws.

4. The chuck of claim 3, wherein the maximum dimension of each wedge in the radial direction of the chuck is less than approximately a half of the radial dimension of each gripping jaw.

5. The chuck of claim 3, wherein each slot in the jaw carrier has its outer end oriented parallel to the outer end of the web received therein.

6. The chuck of claim 1 or 2, wherein a pair of outer, front corners of the plunger formed by each undercut wedge groove therein are chamfered.

7. The chuck of claims 1 or 2, wherein the surface of each overhanging portion is inclined in such a manner that the thickness of each overhanging portion gradually decreases toward the tip thereof.

8. A wedge-operated jaw chuck to be mounted on a machine tool for holding work to be operated upon, comprising:
    (a) an annular jaw carrier having a plurality of guide grooves formed radially in its front face and a plurality of slots formed one in the bottom of each guide groove so as to extend radially outwardly from the inner end of said groove, said slot being narrower than said groove and the inner end of said jaw carrier having bearing surfaces parallel to its axis;
    (b) a plurality of gripping jaws slidably engaged one in each guide groove in the jaw carrier for movement in its radial direction to engage and disengage work;
    (c) a wedge integrally projecting rearwardly from each gripping jaw and comprising a web extending radially of the jaw carrier and a flange at the inner end of the web, the width of the web being less than the width of the flange, part of the web being movably received in one of the slots in the jaw carrier; and
    (d) a plunger slidably mounted in the jaw carrier for movement in its axial direction, the plunger having a plurality of undercut wedge grooves formed in its circumference at an angle to its axis for slidably receiving the wedges of the gripping jaws to cause the movement of the gripping jaws in the radial direction of the jaw carrier by a wedging action upon movement of the plunger in its axial direction, the plunger having a pair of opposed overhanging portions which are formed by each undercut wedge groove, which have axial outer faces for bearing contact with the bearing surface of the jaw carrier and which lie between the jaw carrier and the flange of one of the wedges;

(e) whereby upon any radially outward displacement of the gripping jaws in the operation of the chuck, the axial outer faces of the overhanging portions of the plunger are held against the bearing surface of the jaw carrier and thus are protected against rupture or strain due to bending stresses.

* * * * *